US012680890B2

(12) United States Patent
Haag et al.

(10) Patent No.: US 12,680,890 B2
(45) Date of Patent: Jul. 14, 2026

(54) METHOD AND DEVICE FOR COMPENSATING ELECTROMAGNETIC INTERFERENCES

(71) Applicant: Robert Bosch GmbH, Stuttgart (DE)

(72) Inventors: Florian Haag, Ellhofen (DE); Markus Schuster, Helmstadt (DE); Martin Marquart, Reichenbach (DE); Nikolas Loeffelmann, Dielheim (DE)

(73) Assignee: Robert Bosch GmbH, Stuttgart (DE)

( * ) Notice: Subject to any disclaimer, the term of this patent is extended or adjusted under 35 U.S.C. 154(b) by 208 days.

(21) Appl. No.: 18/427,654

(22) Filed: Jan. 30, 2024

(65) Prior Publication Data

US 2024/0272020 A1 Aug. 15, 2024

(30) Foreign Application Priority Data

Feb. 10, 2023 (DE) ..................... 10 2023 201 097.6

(51) Int. Cl.
*G01D 5/14* (2006.01)
*G01L 1/12* (2006.01)
(52) U.S. Cl.
CPC ............... *G01L 1/125* (2013.01); *G01D 5/14* (2013.01)
(58) Field of Classification Search
CPC ........ G01D 5/14; G01D 3/036; G01D 3/0365; G01R 33/032; G01R 33/0327; G01R 33/00; G01R 33/0082; G01R 33/02; G01R 33/025; G01L 1/26; G01L 5/22; G01L 5/225; G01B 7/02; B60T 7/04; B60T 7/042
See application file for complete search history.

(56) References Cited

U.S. PATENT DOCUMENTS 9,052,343 B2 6/2015 Marten
2011/0144953 A1* 6/2011 Kropp ....................... G05F 7/00
702/194

FOREIGN PATENT DOCUMENTS

CN 109186438 A * 1/2019 ............... G01B 7/02
DE 698 37 643 T2 12/2007

* cited by examiner

*Primary Examiner* — Son T Le
(74) *Attorney, Agent, or Firm* — Maginot, Moore & Beck LLP

(57) ABSTRACT
A method, and device for performing the method, of compensating electromagnetic interference on the output signal of a sensor, wherein a pre-determined singular number or a plurality of at least temporarily current-carrying electrical conductors in the vicinity of the sensor are classified as interference signal sources possibly influencing the output signal of the sensor, in which the output signal of the sensor is detected, and it is determined for each of these interference signal sources whether it is currently current-carrying. Either a fixed correction variable or a correction variable determined on the basis of the detected instantaneous current strength in the current-carrying conductor is detected for each current-carrying interference signal source. The output signal of the sensor is corrected based on the detected correction variables.

8 Claims, 1 Drawing Sheet

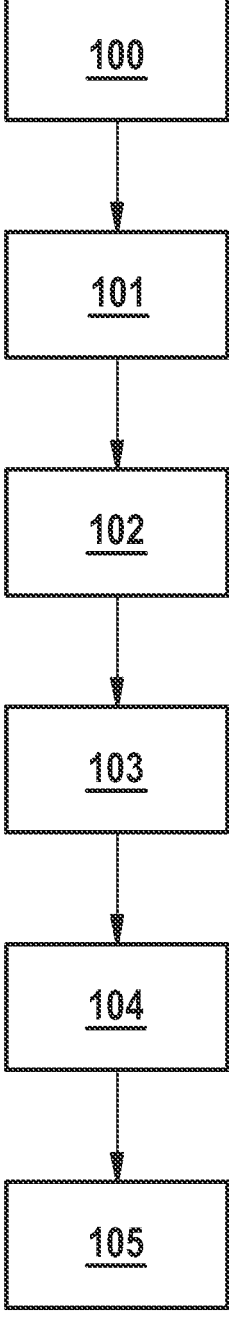

METHOD AND DEVICE FOR COMPENSATING ELECTROMAGNETIC INTERFERENCES

This application claims priority under 35 U.S.C. § 119 to application no. DE 10 2023 201 097.6, filed on Feb. 10, 2023 in Germany, the disclosure of which is incorporated herein by reference in its entirety.

BACKGROUND

A correction circuit for an external magnetic field for automatically correcting influences of an external magnetic field caused by geomagnetism is known from DE 698 37 643 T2.

SUMMARY

The disclosure relates to a method for compensating electromagnetic interference on the output signal of a sensor, wherein a pre-determined singular number or plurality of at least temporarily current-carrying electrical conductors in the vicinity of the sensor are classified or considered as interference signal sources possibly influencing the output signal of the sensor, in which the output signal of the sensor is detected, and it is determined for each of these interference signal sources whether it is currently current-carrying, and either a fixed correction variable or a correction variable determined on the basis of the detected instantaneous current strength in the current-carrying conductor is detected for each current-carrying interference signal source, and the output signal of the sensor is corrected based on the detected correction variables.

An advantageous embodiment of the disclosure is characterized in that the correction variables are offset values for the output signal of the sensor.

An advantageous embodiment of the disclosure is characterized in that the offset values are subtracted from the output signal of the sensor.

An advantageous embodiment of the disclosure is characterized in that the sensor is a sensor based on a magnetic measuring principle.

An advantageous embodiment of the disclosure is characterized in that the sensor based on a magnetic measuring principle is a magnetostrictive sensor.

An advantageous embodiment of the disclosure is characterized in that the sensor is a sensor detecting a pedal travel or a sensor detecting a pressing force applied to a pedal.

An advantageous embodiment of the disclosure is characterized in that the pedal is a brake pedal or an accelerator pedal in a motor vehicle.

Furthermore, the disclosure comprises a device including means provided to perform the methods according to the disclosure. This is in particular a control unit in which the program code for performing the methods according to the disclosure is stored. The control unit may be, for example, a brake control unit, an engine control unit, or a central control unit.

BRIEF DESCRIPTION OF THE DRAWING

FIG. 1 shows the basic flow of an embodiment of the method according to the disclosure.

DETAILED DESCRIPTION

External magnetic fields may influence output signals from sensors. Such external magnetic fields may arise, for example, when current flows through nearby cables or electrical conductors. Information about these electrical currents and the resulting magnetic fields may be used to estimate and at least partially compensate the influence on the sensor signals. Ideally, the output signal of the sensor after compensation corresponds to the output signal which would result without interfering external magnetic fields.

Magnetic field-sensitive sensors can be used in braking systems of motor vehicles, e.g. as pedal travel sensors.

To correct their output signals, the braking system requires information from the vehicle regarding the relevant magnetic fields. Alternatively, information about the current flows may also be communicated and the respective magnetic influence may be estimated from the respective current flow via a function determined in advance. The vehicle can either measure the current flow directly or estimate it via a model. As the consumers in the vehicle are controlled by the vehicle, it is known when which power consumer is in operation. If necessary, several cables or consumers can also be considered separately.

From the information regarding the magnetic field, it can be determined in the brake system how the sensor signals are thereby distorted. In order to compensate for the distortion, the determined influence is subtracted from the sensor signal as an offset. The resulting compensated signal should then display values similar to when there is no interference from an external magnetic field.

One specific example of the application of the disclosure is a sensor that detects the driver input via the brake pedal.

In principle, the idea is not limited to sensors in the brake system, but can also be used in other systems if magnetic sensors are influenced by external magnetic fields.

FIG. 1 shows the basic flow of an embodiment of the method according to the disclosure. After the start of the method in block 100, the output signal of a sensor is detected in block 101.

Subsequently, in block 102, all at least temporarily current-carrying interference signal sources are considered with respect to their current conduction.

Then, in block 103, a correction variable is determined for each of the current-carrying conductors.

In block 104 the output signal of the sensor is then corrected, taking into account the correction variables determined in block 103.

In block 105, the method ends.

What is claimed is:

1. A method for compensating electromagnetic interference on an output signal of a sensor, wherein a pre-determined singular number or plurality of at least temporarily current-carrying electrical conductors in the vicinity of the sensor are classified as interference signal sources possibly influencing the output signal of the sensor, comprising:

detecting the output signal of the sensor;

determining for at least one of the interference signal sources that it is currently current-carrying;

determining for the at least one of the interference signal sources a fixed correction variable or a correction variable on the basis of a detected instantaneous current strength in each current-carrying conductor for each determined current-carrying interference signal source; and correcting the output signal of the sensor based on the determined fixed correction variable or correction variable on the basis of a detected instantaneous current strength.

2. The method according to claim 1, wherein the fixed correction variable or correction variable on the basis of a detected instantaneous current strength are offset values for the output signal of the sensor.

3. The method according to claim 2, wherein the offset values are subtracted from the output signal of the sensor.

4. The method according to claim 1, wherein the sensor is a sensor based on a magnetic measuring principle.

5. The method according to claim 4, wherein the sensor based on a magnetic measuring principle is a magnetostrictive sensor.

6. The method according to claim 5, wherein the sensor is a sensor detecting a pedal travel or a sensor detecting a pressing force applied to a pedal.

7. The method according to claim 6, wherein the pedal is a brake pedal or an accelerator pedal in a motor vehicle.

8. A device including a component configured to perform the method according to claim 1.

* * * * *